(12) United States Patent
Kim

(10) Patent No.: US 7,373,876 B2
(45) Date of Patent: May 20, 2008

(54) COOK POT WITH HEATING LID

(76) Inventor: Byung Doo Kim, Mokdong Apartment 519-801, Yangcheongu Mok-5 Dong 912, Seoul (KR) 168-755

( * ) Notice: Subject to any disclaimer, the term of this patent is extended or adjusted under 35 U.S.C. 154(b) by 99 days.

(21) Appl. No.: 10/968,809

(22) Filed: Oct. 19, 2004

(65) Prior Publication Data

US 2005/0092731 A1 May 5, 2005

(30) Foreign Application Priority Data

Nov. 5, 2003 (KR) .......................... 2003-0078065

(51) Int. Cl.
*A47J 27/10* (2006.01)

(52) U.S. Cl. ..................... 99/403; 99/339; 219/386; 219/401; 219/403; 219/412; 219/436; 219/438; 219/440

(58) Field of Classification Search ................. 99/339, 99/340, 403–418, 348, 444–450, 400, 401; 219/400, 386, 432, 412, 413, 401, 403, 220, 219/89.1, 395–398, 433–440; 220/567.3, 220/694.1, 89.1, 203.4, 203.9
See application file for complete search history.

(56) References Cited

U.S. PATENT DOCUMENTS 4,591,698 A * 5/1986 Chang ..................... 219/400

5,699,722 A    12/1997 Erickson
6,686,569 B2 *  2/2004 Li ............................ 219/433
6,698,337 B1 *  3/2004 Park .......................... 99/342
7,012,221 B2 *  3/2006 Li ............................ 219/433
2004/0144259 A1  7/2004 Kim

FOREIGN PATENT DOCUMENTS

JP   53-155775 U   12/1978
JP   62-117471 U    7/1987
KR   99-224937 B   10/1999

* cited by examiner

*Primary Examiner*—Timothy F. Simone
(74) *Attorney, Agent, or Firm*—Trojan Law Offices

(57) ABSTRACT

A cook pot in which the lid acts as a supplementary heating device to heat the contents inside the pot quickly. The lid has a top and a long cylindrical piece which fits inside the pot body and extends all the way down to the bottom of the pot. A heating band is then located in the lower end of the cylindrical piece towards the bottom of the pot. This heating band heats the entire cylindrical piece, and thus the contents inside the pot.

3 Claims, 4 Drawing Sheets

COOK POT WITH HEATING LID

PRIORITY INFORMATION

This application claims priority to Korea Patent Application No. 2003-0078065, which was filed Nov. 5, 2003.

FIELD OF THE INVENTION

The following invention relates to cooking appliances in general. More particularly, the invention is related to a cook pot which uses the lid to accelerate the heating and boiling of contents inside the cook pot.

BACKGROUND OF THE INVENTION

Conventionally, most pots such as coffee pots, cook pots, rice cookers, and oriental pots for extracting herbs and medicines heat the contents from the bottom of the pot. With this method, it is not possible to heat objects quickly.

Accordingly, in order to solve this problem, this applicant previously filed PCT/KT02/00900 for a cook pot with dual heat sources: a conventional and supplemental heat source. The conventional heat source heats the contents of the pot from the bottom, typically utilizing an external heat source, such as a gas range. The supplemental heat source consists of an electric heat generator which is attached to the lid and extends deep inside the pot. The supplemental heat source then heats the contents from inside the pot. This supplemental heat source, when used in conjunction with the conventional heat source, accelerates the heating of the contents by heating the contents from the inside, as well as from the bottom.

SUMMARY OF THE INVENTION

The present application takes a further step in advancing quick heating techniques. In this invention, the supplemental heating mechanism is actually integrated inside of the lid. The lid has a top and a long cylindrical piece which fits inside the pot body and extends all the way down to the bottom of the pot. A heating band is then located in the lower end of the cylindrical piece towards the bottom of the pot. This heating band heats the entire cylindrical piece, and thus the contents inside the pot.

The lower body of the pot protrudes away from the heating band creating enough distance and space to prevent the pot from over-heating, which would occur if the heating band contacted the lower pot body. Another important reason for such shaping of the pot body is so that the contents of the pot absorb the thermal energy generated by the heating band. In this way, the pot ultimately saves energy.

As compared to previous inventions, the supplemental heating mechanism does not take up any extraneous space inside of the pot, thus allowing the pot to hold more contents. In addition, since the heating mechanism is actually integrated inside of the lid, there is no additional heating element to clean.

DETAILED DESCRIPTION OF THE PREFERRED EMBODIMENTS

Figure 1:
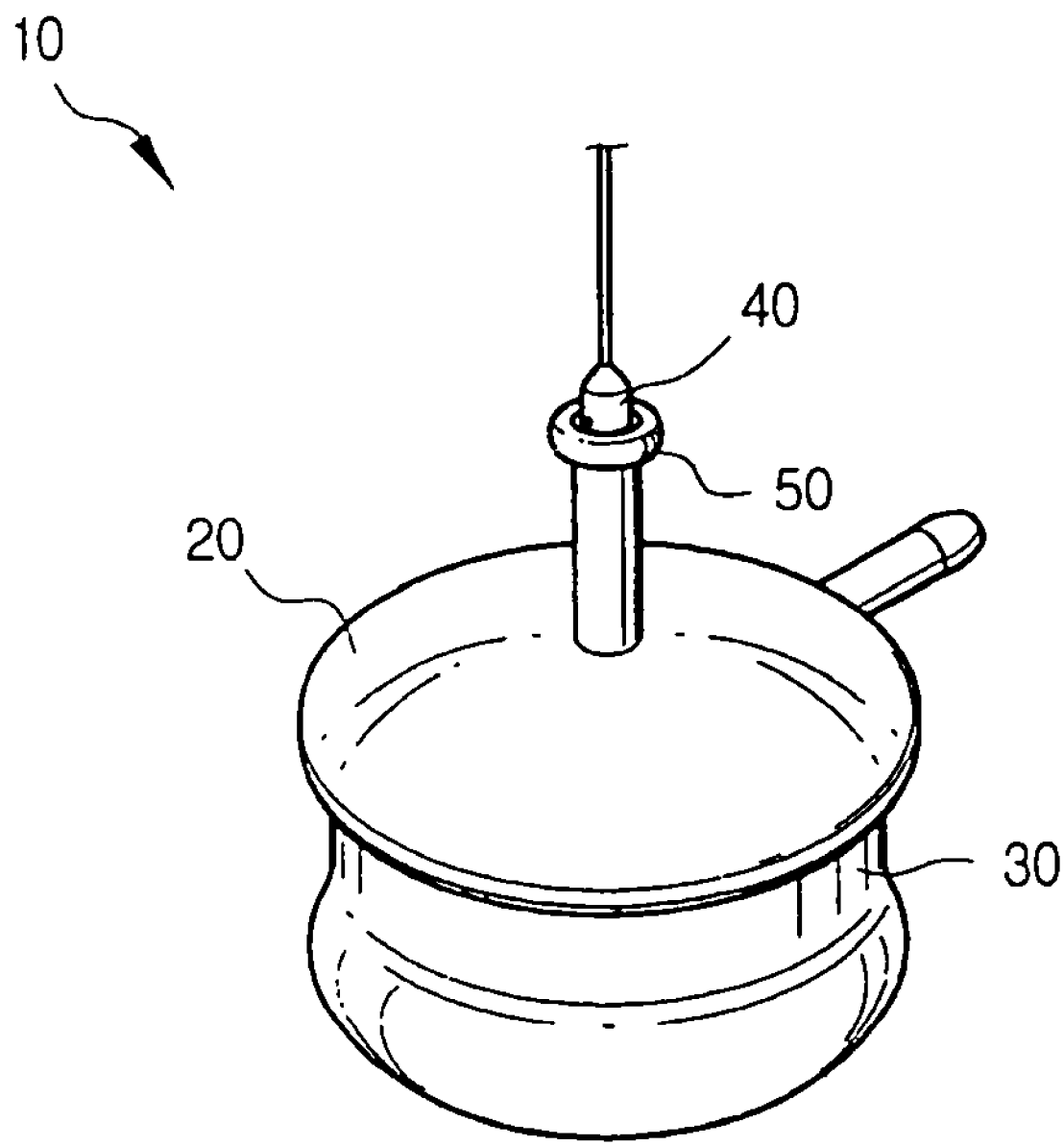
FIG. 1 is a perspective view of a cook pot of the present invention.
Figure 2:
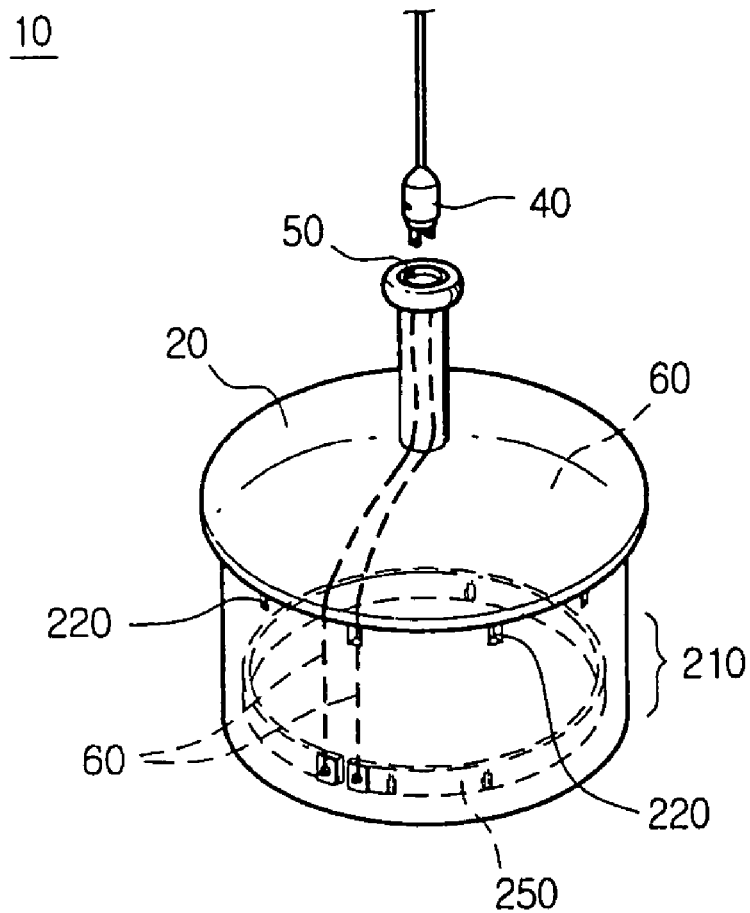
FIG. 2 is an exploded perspective view illustrating a lid with an electric heating mechanism as well as the lower part of the pot.
Figure 2:
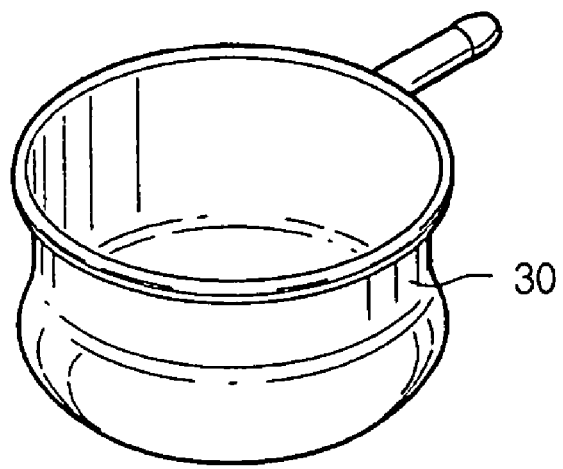
Figure 3:
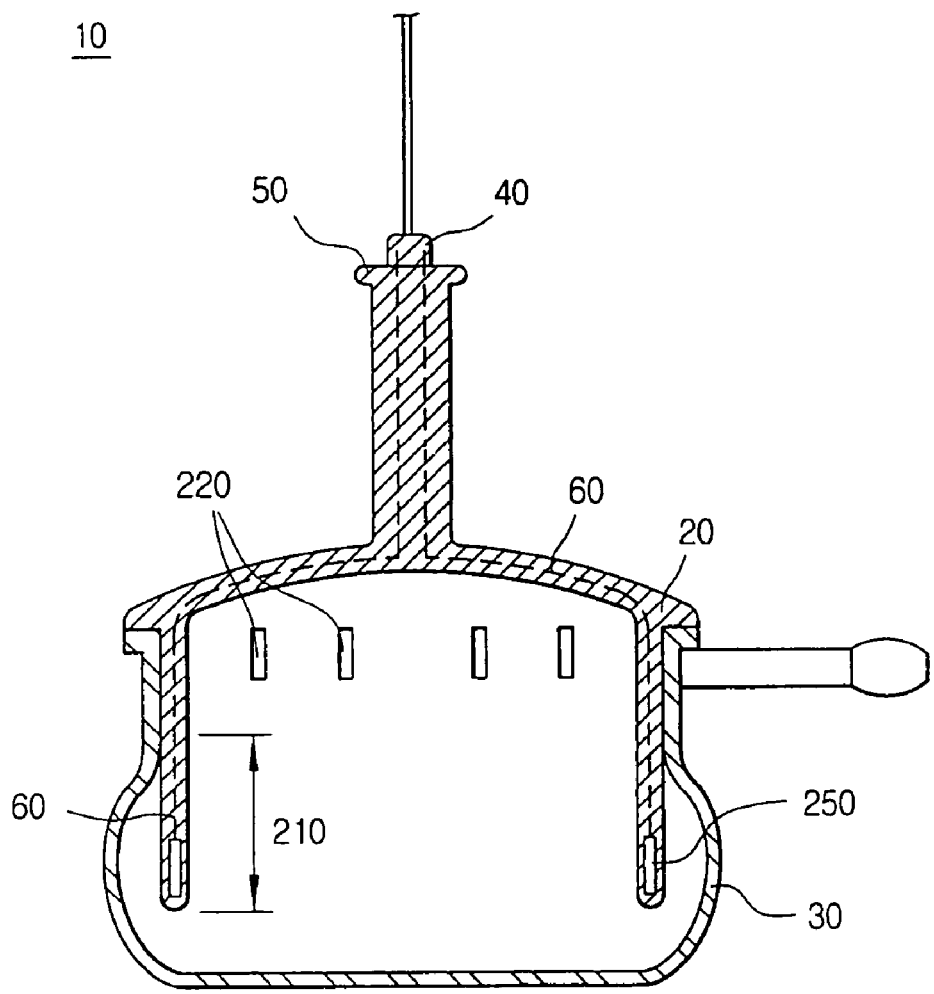
FIG. 3 is a cross sectional view of the present invention.

As shown in FIGS. 1 through 3, a cook pot 10 is comprised of a pot body 30, a lid 20, and a socket 50 for connection with an electrical plug 40. A heating band 250 is integrally formed inside of and towards the bottom of the lid 20. Electricity is supplied to the heating band 250 through wires 60 in material 254 connected to the socket 50. The heating band heats up the lower cylindrical part 210 of the lid 20 and thus promotes heating of the contents inside the pot. The upper cylindrical part of the lid has several steam deflation slits 220 which control the steam pressure.

The lower cylindrical part 210 of the lid 20 is of sufficient length such that it extends towards the bottom of the pot and is in proximity to the bottom of the pot. Inside the lower cylindrical part 210 is the heater band 250. The heating band 250, which is heated by electricity, is integrally formed inside the walls of the lower cylindrical part 210 of the lid 20. Accordingly, the heating band 250 has the same circular shape as the lower cylindrical part and is comprised of a metal or non-metal, such as ceramic or polymer, heat generator 251 and a band insulator 252.

Figure 4:
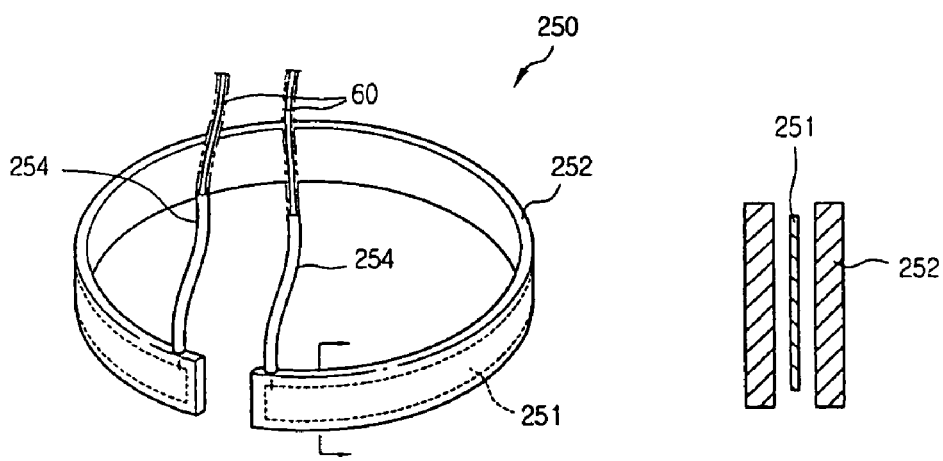
FIGS. 4 and 5(a)-(c) are perspective views and cross sectional view of heating band which can be used in this invention.

As seen in FIG. 4, the heat generator 251 is insulated electrically with the band insulator 252. The band insulator is preferably made of a nonconductive material such as ceramic. The heat generator then heats the band insulator which, in turn, heats up the lower cylindrical part 210 of the lid. The lower cylindrical part 210, in conjunction with heat from the bottom, accelerates the heating of the contents inside of the pot.

In order to prevent excess pressure from building inside of the pot, several steam deflation slits 220 are formed vertically on the upper cylindrical part of the lid. These slits 220 prevent excess pressure from building and the contents from overflowing. The steam deflation slits 220 are closed when the lid 20 is rested on the pot 30. As the pressure builds, the lid (20) moves upwards and the steam deflation slits (220) open, thus releasing the excessive, high-pressure steam. This prevents potential explosions due to excessive steam build up produced by overheating. In addition, since the contents will not overflow, there is no need to constantly monitor the pot.

As seen in FIG. 3, the lower part of the pot is expanded outwardly to provide space between the heating band and the pot. This expanded space prevents possible contact between the heating band and the pot wall. If the heating band contacted the pot wall, the pot wall would heat up, thus potentially burning the user. Another important reason for the outward shape of the lower part of the pot is so that the contents of the pot absorb the heat generated by the heating band.

Figure 5A:
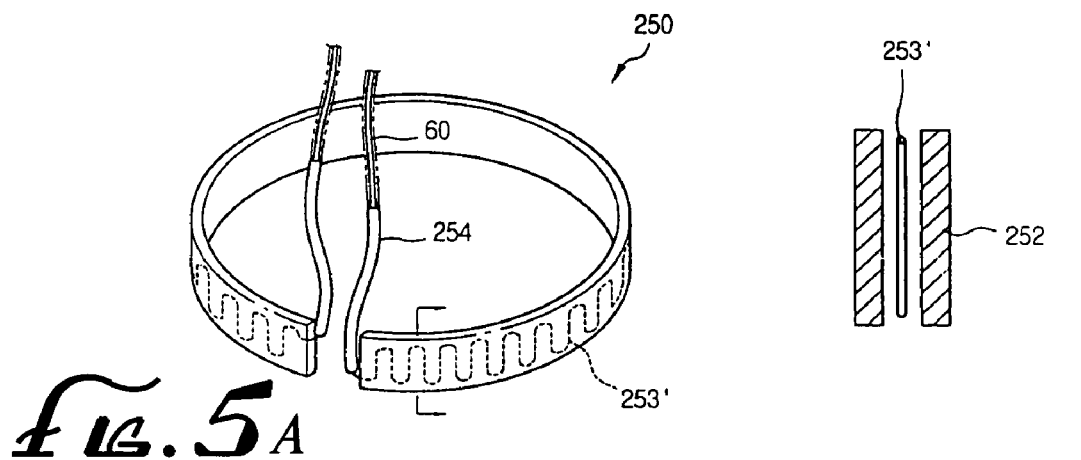
Figure 5B:
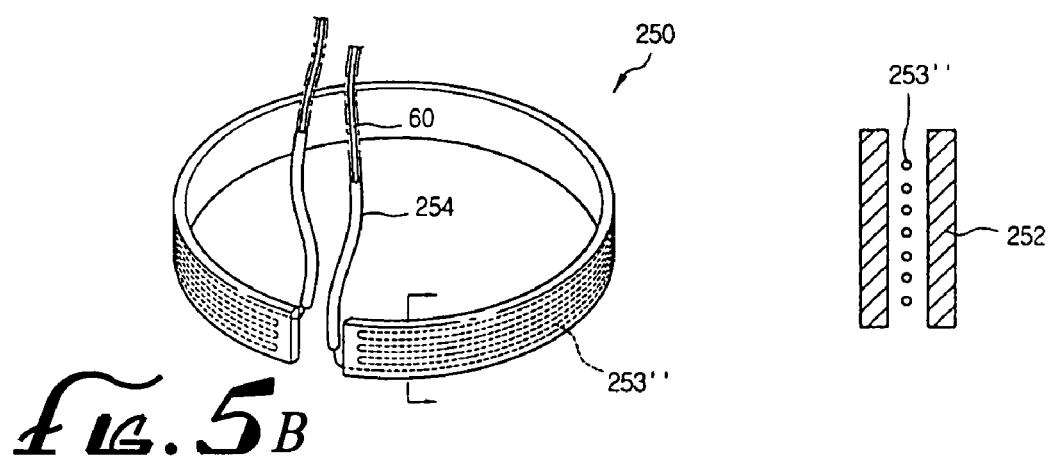
Figure 5C:
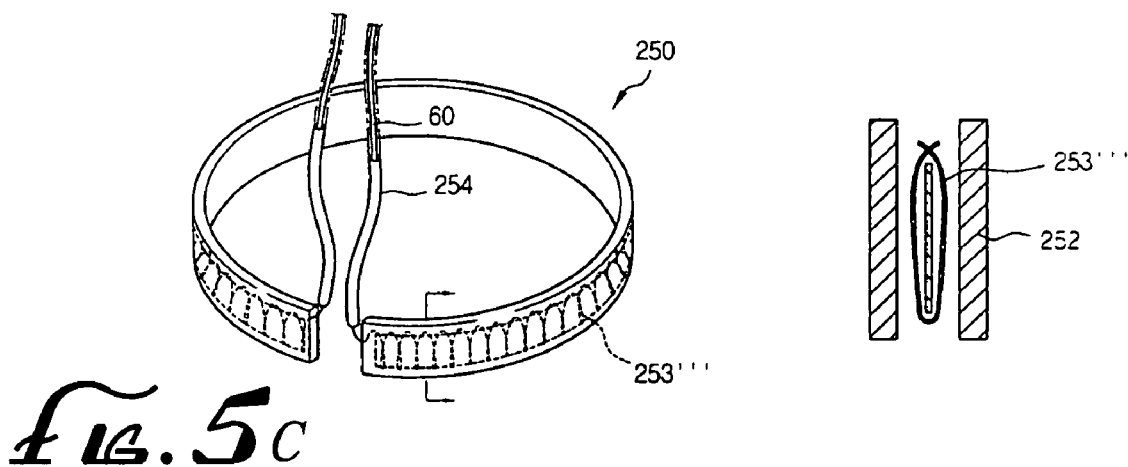

FIGS. 5(a)-(c) illustrate other preferred embodiments of the heating band. In FIGS. 5(a) and 5(b), the heat generator 253 winds its way back and forth in the band insulator following an "S" type path. FIG. 5(c) illustrates the heat generator 253 in the shape of a coil wound inside the band insulator.

The final components to the cook pot are the addition of controllers and switches, as commonly known in the art, to automatically set cooking times and temperatures, detect pressures, and control electricity.

Although the present invention has been described in detail with respect to certain preferred versions thereof, other versions are possible. Therefore, the scope of the claims should not be limited to the description of the preferred versions contained herein.

I claim:

1. A cook pot comprising:
(a) a pot body having a lower part of substantially uniform wall thickness which is expanded outwardly;
(b) a lid having an upper cylindrical part, a lower cylindrical part that is capable of extending into said lower part of pot body that is expanded outwardly when said lid is engaged with said pot body, and a socket, said lid having deflations slits located in upper cylindrical part, said lid having a heating band integrally formed in said lower cylindrical part of said lid;
(c) said heating band comprised of a heat generator and a band insulator; and
(d) an electric supply connected to the heating band through wires connected to the socket.

2. The cook pot of claim 1, wherein the heat generator winds its way back and forth in the band insulator following an "S" type path.

3. The cook pot of claim 1, wherein the heat generator is in the shape of a coil wound inside the band insulator.

* * * * *